(12) United States Patent  
Wosinski et al.

(10) Patent No.: US 9,649,737 B2  
(45) Date of Patent: May 16, 2017

(54) MACHINES AND PROCESSES FOR FITTING CABLE BUSHINGS

(71) Applicant: SCHLEUNIGER HOLDING AG, Thun (CH)

(72) Inventors: Eugen Wosinski, Pfaeffikon (CH); Ivo Meierhans, Luzern (CH); Ruedi Imfeld, Steinhausen (CH)

(73) Assignee: SCHLEUNIGER HOLDING AG, Thun (CH)

( * ) Notice: Subject to any disclaimer, the term of this patent is extended or adjusted under 35 U.S.C. 154(b) by 720 days.

(21) Appl. No.: 14/024,873

(22) Filed: Sep. 12, 2013

(65) Prior Publication Data

US 2014/0068910 A1    Mar. 13, 2014

Related U.S. Application Data

(60) Provisional application No. 61/700,316, filed on Sep. 12, 2012.

(30) Foreign Application Priority Data

Sep. 12, 2012   (EP) ..................................... 12184057

(51) Int. Cl.
*H01R 43/00* (2006.01)
*B23Q 17/24* (2006.01)
(Continued)

(52) U.S. Cl.
CPC ........ *B23Q 17/2409* (2013.01); *B23P 19/084* (2013.01); *H01R 43/005* (2013.01);
(Continued)

(58) Field of Classification Search
CPC  B23Q 17/2409; B23Q 19/084; B23Q 15/007; Y10T 29/49769; Y10T 29/53087
(Continued)

(56) References Cited

U.S. PATENT DOCUMENTS 4,521,946 A    6/1985  Dusel et al.
4,586,768 A    5/1986  Eck
(Continued)

FOREIGN PATENT DOCUMENTS

CA    2254017 A1    5/2000
CA    2254057 A1    5/2000
(Continued)

OTHER PUBLICATIONS

EPO search report and written opinion from priority EPO application EP12184057, dated Feb. 28, 2013, in German.
(Continued)

*Primary Examiner* — Peter DungBa Vo
*Assistant Examiner* — Jeffrey T Carley

(57) ABSTRACT

Machines for fitting cable bushings on a cable have a hollow mandrel (11) for receiving cable bushing (12) and a cable in a fitting region (A). Rotatably mounted stripping jaws (8a, 8b) arranged in the fitting region (A) fit the cable bushing (12) on the cable. A camera (9a, 9b) is directed towards the fitting region (A). A rotation axis of at least one of the stripping jaws (8a, 8b) is at a lateral distance from ray-of-view (D) originating from the camera (9a, 9b) and running through the fitting region (A). The stripping jaws (8a, 8b) may be opened to an extent that makes it possible for the camera (9a, 9b) to have an unimpeded view of the fitted cable bushing (12). Related methods for operating such machines (1) are also disclosed.

6 Claims, 4 Drawing Sheets

(51) Int. Cl.
*B23P 19/08* (2006.01)
*B23Q 15/007* (2006.01)

(52) U.S. Cl.
CPC ....... *B23Q 15/007* (2013.01); *Y10T 29/49769* (2015.01); *Y10T 29/53087* (2015.01)

(58) Field of Classification Search
USPC .................................................... 29/720, 721
See application file for complete search history.

(56) References Cited

U.S. PATENT DOCUMENTS

| | | | |
|---|---|---|---|
| 4,653,182 A | | 3/1987 | Fukuda et al. |
| 5,016,346 A | | 5/1991 | Gerst et al. |
| 5,063,656 A | | 11/1991 | Hirano et al. |
| 5,284,001 A | | 2/1994 | Ochs |
| 5,315,757 A | | 5/1994 | Koch et al. |
| 5,333,374 A | * | 8/1994 | Pittau ............... H01R 43/20 29/33 M |
| 5,392,505 A | | 2/1995 | Harada |
| 5,432,996 A | | 7/1995 | Imgrut et al. |
| 5,456,148 A | | 10/1995 | Hoffa |
| 5,465,478 A | | 11/1995 | Anderson et al. |
| 5,485,660 A | * | 1/1996 | Pittau ............... H01R 43/20 29/718 |
| 5,732,750 A | | 3/1998 | Soriano |
| 5,903,970 A | * | 5/1999 | Pittau ............... H01R 43/20 29/33 M |
| 5,913,553 A | | 6/1999 | Takada |
| 6,276,564 B1 | | 8/2001 | Reich |
| 6,336,267 B1 | | 1/2002 | Hoffa |
| 6,738,134 B2 | | 5/2004 | Maeda ............... G01N 21/8806 313/364 |
| 6,763,574 B1 | | 7/2004 | Woll |
| 6,990,730 B2 | | 1/2006 | Fujita et al. |
| 7,047,618 B2 | | 5/2006 | Hunter |
| 7,363,703 B2 | | 4/2008 | Imgrut |
| 2003/0007774 A1 | * | 1/2003 | Christopher ............. B08B 3/12 385/147 |
| 2005/0108872 A1 | | 5/2005 | Konrath et al. |
| 2010/0310210 A1 | * | 12/2010 | Murayama ........... G02B 6/4202 385/43 |
| 2013/0104391 A1 | | 5/2013 | Wosinski |

FOREIGN PATENT DOCUMENTS

| | | | |
|---|---|---|---|
| DE | 19901439 C1 | 2/2000 | |
| EP | 0462923 B1 | 12/1991 | |
| EP | 0533045 A2 | 3/1993 | |
| EP | 0533045 A3 | 7/1993 | |
| EP | 0626738 B1 | 12/1997 | |
| EP | 0881720 B1 | 9/2002 | |
| EP | 1022821 B1 | 1/2004 | |
| EP | 1912296 A1 | 4/2008 | |
| EP | 1689049 B1 | 11/2008 | |
| GB | 412859 A | 7/1934 | |
| GB | 1379964 A | 1/1975 | |
| JP | H09-171878 | * 6/1997 | ........... H01R 43/048 |
| JP | H09-171878 A | 6/1997 | |
| JP | 2000-184542 A | 6/2000 | |
| JP | 2004-014278 A | 1/2004 | |
| JP | 2005-166297 A | 6/2005 | |
| JP | 2009-042022 A | 2/2009 | |
| WO | 2011/158145 A1 | 12/2011 | |

OTHER PUBLICATIONS

Copending commonly-owned U.S. Appl. No. 13/711,645, filed Dec. 12, 2012.
Notice of Allowance dated Oct. 7, 2015 in commonly owned U.S. Appl. No. 14/073,896.
Aug. 25, 2015 Office Action in commonly-owned U.S. Appl. No. 13/711,645.
EPO search report and written opinion from priority EPO application EP12184057, dated Feb. 28, 2013, in German (copy enclosed by this submission).
Copending commonly-owned U.S. Appl. No. 14/073,896, filed Nov. 7, 2013.

\* cited by examiner

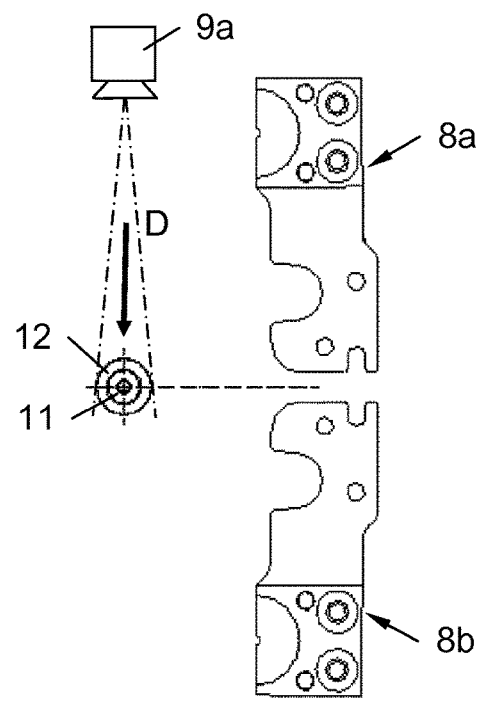
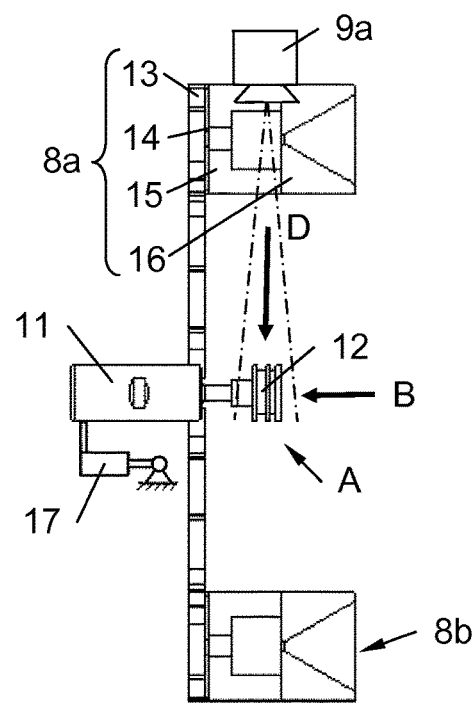
FIG 3
FIG 4
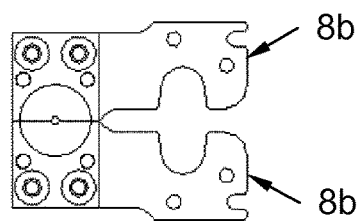
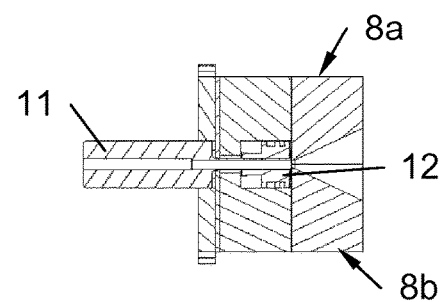
FIG 5
FIG 6

MACHINES AND PROCESSES FOR FITTING CABLE BUSHINGS

This application claims benefit of priority to prior U.S. provisional application No. 61/700,316 filed on Sep. 12, 2012, and this application also claims benefit of priority to prior European application no. EP12184057 filed on Sep. 12, 2012, and the entireties of European application no. EP12184057 and of U.S. application No. 61/700,316 are expressly incorporated herein by reference each in their entirety, for all intents and purposes, as if identically set forth in full herein.

Machines for fitting cable bushings (seals) on wires/cables may include a hollow mandrel arranged in a fitting region and configured to receive the cable bushing on its outer diameter and a wire/cable in its inner diameter. Stripping jaws movable towards each other may be arranged in the fitting region to grasp the cable bushing pushed onto the hollow mandrel when in a closed position. A drive typically pushes the cable bushing onto the wire/cable by executing a relative movement between the hollow mandrel and the stripping jaws.

Methods for fitting cable bushing on wires/cables may include the steps of pushing the cable bushing onto a hollow mandrel; grasping the cable bushing with openable and closable stripping jaws; pushing the wire/cable into the hollow mandrel; pushing the cable bushing onto wire/cable by executing relative movement between hollow mandrel and stripping jaws; and, opening the stripping jaws.

In the prior art, for example, EP1022821A1 discloses a method for fitting bushings of electric cables, where a bushing is received by a centering mandrel from a conveyor rail, and is pushed onto a spreading part. The spreading part is then pivoted into an axial position coinciding with the longitudinal axis of the cable to be fitted with bushing. A first relative movement takes place between the spreading part and the stripping jaws. After the stripping jaws have closed to fix the bushing, a second relative movement is executed between the spreading part and the stripping jaws on one side and the cable to be fitted on the other side, so that finally, in a third relative movement between the spreading part on one side and the stripping jaws and the cable to be fitted on the other side, the bushing is pulled off the spreading part, so that the fitted cable can be removed after the stripping jaws are opened.

However, in EP1022821A1, a solution for testing the quality of the fitted cable is not disclosed, and, as a result, cables with properly fitted bushings are mixed in the production process with poorly made cables and even unusable rejects. The assembled cables must therefore be sorted again laboriously, with regards to their quality, in a subsequent step. A further disadvantage of the machine disclosed in EP1022821A1 is that the stripping jaws are moved horizontally during opening and closing, with the result that the machine requires a relatively large amount of space in width. This is a disadvantage in that, in a factory for assembling cables, several different machines are generally placed next to each other, and the machine arrangement overall is relatively wide and requires a comparatively large amount of space.

EP0462923B1 discloses another machine that has a similar construction to EP1022821A1, but likewise has no possibility of checking a fitted cable bushing.

A method for electronically assisted checking of a stripped cable end is known from JP H09-171878A. JP H09-171878A discloses a machine including a video camera, directed towards a cable end and arranged above same, and with which the cable end may be observed optically or visually. In this reference there is no indication of the use of this camera for checking cable bushings. It is also not possible for a bushing check to take place with this arrangement if the bushings are held by stripping jaws as is known per se, as the stripping jaws would interfere with the field of view of the camera.

Industrial arrangements often involve a plurality of machines placed in a circle or circle segment, in the center of which a robot is situated to handle cables to be assembled. This robot passes a cable from one manufacturing station to the next. The wider the individual machines, in particular in the end face region thereof, the larger the circle needed therefor, and the longer the arm of the robot must be to be able to reach the individual machines. This may be particularly disadvantageous, as the accelerations, forces and necessary drive power occurring during the movement increase disproportionately when the length of the robot arm increases. As the parameters discussed cannot be increased arbitrarily, a reduced movement speed of the robot must be expected, as a result of which the processing time for producing assembled cables is considerably increased overall. With extremely high piece numbers and batch rates in cable production, this may mean a serious disadvantage.

As the EP0462923B1 discloses a machine for fitting cable bushings having rotatably mounted stripping jaws that pivot out horizontally during opening, the space problems mentioned for EP1022821A1 may be considered as also applying to the machine disclosed in EP0462923B1.

The present disclosure relates to improved machines and improved methods for fitting cable bushings on wires/cables, and for the purposes of this disclosure and its claims, either wires or cables may conveniently and equivalently be identically referred to and indicated by the single term "cable(s)". In particular, a check of the fitted cable bushing should be possible without significantly increasing the width of the machine, in particular in an end face region thereof. The width of the machine should optionally even be reduced compared to known arrangements, if possible.

Improved machines may include camera directed towards the fitting region. The stripping jaws may be rotatably mounted, and at least the rotation axis of one of the stripping jaws may be at a lateral distance from an observation beam or ray-of-view emanating (originating) from the camera and running through the fitting region. The stripping jaws may be opened to an extent so that it is possible for the camera to have an unhindered view of the fitted cable bushing.

Methods may involve rotation of the stripping jaws during opening, wherein at least one stripping jaw is rotated about a rotation axis that is at a lateral distance from an observation beam or ray-of-view emanating from a camera and running through the fitting region. The camera is directed towards the fitting region, and the stripping jaws are opened to an extent so that it is possible for the camera to have an unhindered view of the fitted cable bushing.

In other words, each or ray-of-view originating from the camera and impinging on the fitted cable bushing runs past the opened stripping jaws. The opened stripping jaws thus also lie completely outside a wedge-shaped region, or region-of-view, that extends from the camera towards the cable bushing and encloses or encompasses the cable bushing laterally.

Accordingly it is possible for a fitted cable bushing to be checked without significantly increasing machine width. In specific version, that are indicated below, the width of machines may even also be reduced compared to known arrangements, despite the increased functionality. For example, the checking may take place with a video camera recording production process as a film. Of course, recording of individual images is also possible. For example, an image may be recorded directly after the jaws have opened. It is also conceivable for the image to be triggered in a somewhat time-delayed manner after the opening of the jaws or the command therefor.

A camera may be directed towards the hollow mandrel to ensure that the camera have good view of the cable bushing during almost the entire production process (but with the exception of the period during which the stripping jaws are closed).

The camera may arranged above the fitting region or above the hollow mandrel. The width of the machine is not increased, despite the installation of the camera, thanks to the specific arrangement of the camera. Furthermore, virtually no dirt can accumulate on the camera lens. Alternatively, it is also conceivable for the camera to be arranged underneath the fitting region or underneath the hollow mandrel. In particular, the optical axis (or center ray-of-view in its field-of-view) of the camera does not necessarily have to be vertically aligned, but can also be oblique.

The rotation axes of the stripping jaws may aligned parallel to the hollow mandrel. This produces a simple possibility of feeding cable/wire.

The rotation axes of the two stripping jaws may be arranged one above the other on one side of the hollow mandrel and at an equal distance from the latter. This permits the camera to have a good view of the hollow mandrel and the cable bushing. The machine can also be relatively narrow in the fitting region.

The optical axis of the camera may run through the hollow mandrel, in particular through its axis. The cable bushing to be checked then appears in the center of the image recorded by the camera. As a result, effects such as reduced sharpness at the edges and vignetting are negligible.

The rotation axes of the two stripping jaws may be arranged on one side away from the observation beam, in particular away from the optical axis of the camera. Each rotation axis of each stripping jaw may be arranged on each side away from a straight line running through the axis of the hollow mandrel and aligned normally to the center observation beam/optical axis. As a result, only one stripping jaw lies within the field of view of the camera over the cable bushing to be checked, but may easily be pivoted out of the field of view of the camera during opening of the stripping jaws, thanks to such a specific arrangement.

In this connection, the rotation axes of the stripping jaws may be at an equal distance from the center observation beam/optical axis of the camera and/or from the straight line running through the axis of the hollow mandrel and aligned normally to the optical axis. This produces symmetrical conditions for the stripping jaws used, as a result of which advantages may be understood if the stripping jaws or the components of the same are constructed identically.

In versions of machines for fitting bushings, the pivot range of the stripping jaws between their closed position and their open position is essentially 90°. This permits a camera to have a good view of the fitted bushing without excessive pivoting of the stripping jaws being necessary. When the stripping jaws have to be moved very quickly during production of assembled cables owing to the high clock speeds, this may be an important advantage. In the case of comparatively small bushings, it is also possible to open the stripping jaws less than 90°, as a result of which the production of the cables can take place even faster.

The stripping jaws or their components may be each identical. In this manner, the production costs and stock keeping costs for the stripping jaws may be reduced. Such identity does not necessarily relate to the entire stripping jaw, but may also relate just to parts thereof, for example the pivot plate.

The stripping jaws may be prepared to touch each other in a form-fitting manner when in closed position. This aligns stripping jaws well to each other when in closed position, as a result of which production process may proceed in a trouble-free manner.

Stripping jaws may be prepared to enclose and contact the hollow mandrel when in closed position. In this manner, particularly good centering of stripping jaws with respect to each other and furthermore with respect to the hollow mandrel may be achieved. This may play an important role in particular in the case of very small cable diameters or wire diameters, as even small errors in centering may lead to faults in the production process.

It should be noted at this point that both the form fit between the stripping jaws and the centering on the hollow mandrel may be understood to provide basis for claims.

In some versions of machines for fitting bushings, a stripping jaw may include an intermediate plate and a pivot plate that is at least four times thicker. This would make it possible to adapt only the intermediate plate to the diameter of the hollow mandrel onto which the cable bushing is pushed, which diameter changes depending on the cable bushing to be fitted. As the intermediate plate is substantially thinner than the pivot plate, this adaptation, in concrete terms the production of a cut-out with a size matching the cable bushing and/or the wire/cable, may take place with comparatively little processing outlay.

It should be noted at this point that also the division of the stripping jaws into pivot plate and intermediate plate may be understood to provide basis for claims.

Moreover, if the stripping jaws are mounted with the aid of quick release fasteners on the machine, these being operable without tools, in particular a drive for the stripping jaws. In this manner the stripping jaws, which typically may each be used for only certain types of cable bushings, may be changed easily. The set-up times when changing the produced cable are therefore shortened.

It should be noted at this point that finally the quick release fastener may be understood to provide basis for claims.

A quick release fastener may include a rotatable, spring-mounted closing lever designed to press the stripping jaws in a closed position with the aid of the spring force against the machine, in particular against the drive for the stripping jaws. In this manner, the stripping jaw is securely anchored in its holder. The provision of a spring also permits thickness tolerances of the stripping jaw to be compensated well.

The quick release fastener may include a sprung latching element, in particular a sprung ball pin designed to latch into a cut-out in the stripping jaws when the quick release fastener is in the closed position. In this manner, a stripping jaw is prevented from slipping out of its holder despite the high acceleration occurring during operation.

A stripping jaw may have at least one cutout at a distance from its rotation axis, into which cutout a pin of the drive of the stripping jaws engages. This makes it possible to easily change the stripping jaw as it only has to be pulled off the drive, and it also allows good torque transmission from the drive to the stripping jaws.

Finally, an error signal may be emitted when an incorrectly fitted cable bushing is discovered. In this manner, incorrectly fitted cables may immediately be ejected or diverted from the production process. Time-consuming sorting of assembled cables of different quality is therefore no longer necessary. The error signal may, for example, be emitted as optical and/or acoustic alarms, and for example also as a signal to a device that effects the disposal of the cable/wire with the incorrectly fitted cable bushing.

It should be noted at this point that the variants presented for bushing-fitting machines, as well as possible resulting advantages, may be applied mutatis mutandis to methods for fitting bushings, and vice versa.

Further advantages, features and details of within the scope of the present disclosure may be found in the following description, where exemplary version are discussed with reference to the accompanying drawings.

The appended reference labels list should be understood as a part of the disclosure. The figures are described in a cohesive and comprehensive manner. While like reference symbols denote the same components, reference symbols with different indices may specify functionally identical or similar components.

In the drawings:

FIG. 3 depicts a schematic illustration of the stripping jaws and of the hollow mandrel for fitting the cable bushing in a front view and in an open position;

FIG. 4 depicts the same as FIG. 3, but in a side view;

FIG. 5 depicts the same as FIG. 3, but with closed stripping jaws;

FIG. 6 depicts the same as FIG. 5, but in section;

By way of definition, it should be stated at this point that reference in this specification to "one version," "this version," or "a version," and the like, means that a particular feature, structure, or characteristic described in connection with the version may be included in at least one version according to the disclosure. The appearances of phrases such as "in one version," in various places in the specification are not necessarily all referring to the same version, nor are separate or alternative versions mutually exclusive of other versions. Moreover, various features are described which may be exhibited by some versions and not by others. Similarly, various requirements are described which may be requirements for some versions but not other versions. Additionally, the terms "connected" or "coupled" and related terms are generally used in an operational sense, as operative or operational, and are not necessarily limited to merely a direct connection or coupling. Furthermore, as used throughout this specification, the terms 'a', 'an', 'at least' do not denote a limitation of quantity, but rather denote the presence of at least one of the referenced item, and the term 'a plurality' should be understood to denote the presence of more than one referenced items.

Figure 1:
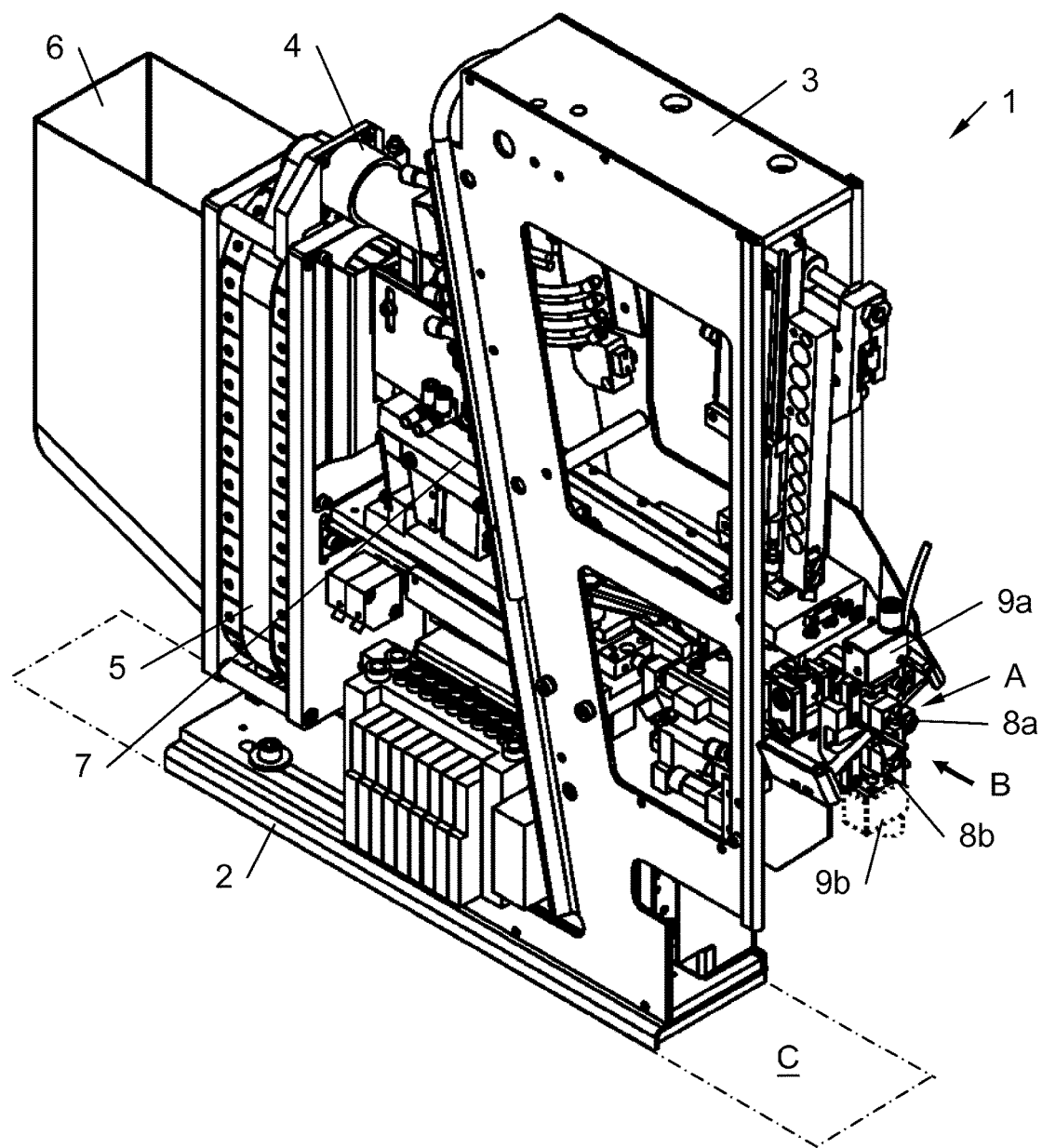
FIG. 1 depicts an exemplary machine 1 for fitting cable bushings.

FIG. 1 depicts an exemplary machine 1 for fitting cable bushings on a wire/cable. The machine 1 includes a frame 3 connected to a base plate 2 and on which a chain conveyor 5 is mounted. The chain conveyor 5 is driven by a motor 4 and is connected to a storage container 6. The machine 1 also includes a vibrating rail 7, two stripping jaws 8a and 8b in a fitting region A, and a camera 9a that is directed towards the fitting region A (see also the observation beam D in FIG. 3).

With the aid of chain conveyor 5, cable bushings may be conveyed individually from the storage container 6 onto vibrating rail 7 and from there to the fitting region A, where they are fitted onto wires/cables. Wire/cable is fed in the feed direction B. Details of the bushing fitting process may be found in FIGS. 2 to 6.

In FIG. 1, the area C needed by machine 1 is also depicted, which area includes the projection of further machine parts onto the floor in addition to the area for the base plate 2. The area C is not necessarily rectangular, but may for example taper in the front region. This may be advantageous in particular if several machines are placed in a circle or circle segment.

At this point it is noted that machine 1 depicted in FIG. 1 is merely by way of example, to illustrate the basic functioning of the bushing fitting process. Of course, such a machine 1 may also be configured differently from the depiction in FIG. 1. For example, the bushings may also be conveyed from the storage container 6 into the fitting region A in a different manner from that stated, for example with the aid of a tube or hose, through which the bushings are dropped or blown.

Figure 2:
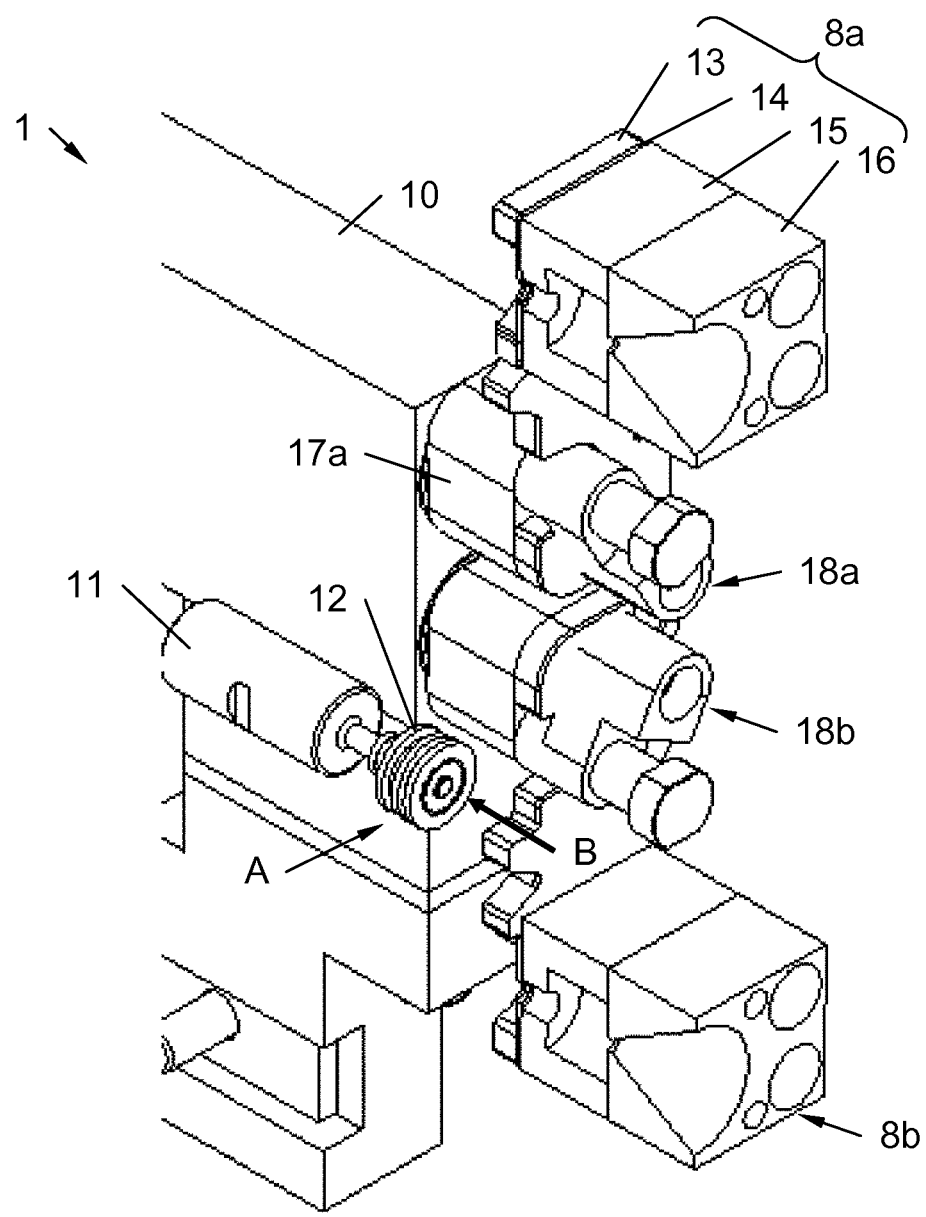
FIG. 2 depicts a detail of the machine of FIG. 1 in a fitting region in a perspective view.

FIG. 2 depicts in detail the part of the machine 1 arranged around the fitting region A. In FIG. 2, a base support 10 and a hollow mandrel 11 with a cable bushing 12 placed on it may be seen. Furthermore, the stripping jaws 8a and 8b may be seen, which in this example each comprise a pivot plate 13, an intermediate plate 14, a bushing cage 15 and a feed funnel 16. Two swivelling drives 17a having two quick release fasteners 18a and 18b are also depicted in FIG. 2.

The function of the components shown in FIG. 2 may be explained in more detail using FIGS. 3-6,7-9.

FIGS. 3-4 depict stripping jaws 8a, 8b in open state in a front view (FIG. 3) and in a side view (FIG. 4). Camera 9a and its direction of view (indicated with dash-dotted lines), and an observation beam/ray-of-view D directed towards cable bushing 12 may also be seen. Furthermore, FIG. 4 schematically depicts an exemplary drive 17, shown by way of example (in this case configured by way of example as a pneumatic cylinder). This drive 17 effects a relative movement between hollow mandrel 11 and stripping jaws 8a, 8b. FIGS. 5-6 depict stripping jaws 8a, 8b in closed state in a front view (FIG. 5) and in section (FIG. 6).

As should be understood, a version of exemplary method for fitting a cable bushing 12 on a wire/cable includes steps of: pushing the cable bushing 12 onto the hollow mandrel 11; grasping cable bushing 12 with stripping jaws 8a, 8b so that the cable bushing 12 is accommodated in bushing cage 15 (see in particular FIG. 6); pushing the wire/cable into the hollow mandrel 11 through feed funnel 16 in feed direction B; pushing cable bushing 12 onto the wire/cable by executing a relative movement between hollow mandrel 11 and stripping jaws 8a, 8b; and, opening stripping jaws 8a, 8b.

Stripping jaws 8a, 8b are advantageously rotated when opened, in such a manner that at least one stripping jaw 8a, 8b is pivoted about a rotation axis, which is at a lateral distance from a camera optical axis ray-of-view D originating from a camera 9a and running through the fitting region A. Stripping jaws 8a, 8b are opened to an extent that camera 9a has an unhindered view of fitted cable bushing 12 (see in particular FIG. 3).

If an incorrectly fitted cable bushing 12 is found, an error signal may advantageously be emitted, for example as optical and/or acoustic alarms, and for example also as a signal to a device that effects disposal of the cable/wire with the incorrectly fitted cable bushing 12.

It should also be understood that in an exemplary version machine 1 for fitting cable bushings 12 on a wire/cable therefore includes hollow mandrel 11 arranged in a fitting region A designed to receive cable bushing 12 on its outer diameter and the wire/cable in its inner diameter. Stripping jaws 8a, 8b movable towards each other, are arranged in fitting region A and are designed to grasp the cable bushing 12 pushed onto the hollow mandrel 11 when in a closed position. The drive 17 may be designed to push cable bushing 12 onto the wire/cable by executing a relative movement between the hollow mandrel 11 and the stripping jaws 8a, 8b. Furthermore, the machine 1 includes a camera 9a directed towards the fitting region A. Stripping jaws 8a, 8b are mounted rotatably, and at least the rotation axis of one of the stripping jaws 8a, 8b is at a lateral distance from a ray-of-view D originating from the camera 9a and running through the fitting region A. These stripping jaws 8a, 8b may be openable to an extent so far that it is possible for the camera 9a to have an unhindered view of the fitted cable bushing 12.

In other words, considering FIG. 3, each observation beam D emanating from camera 9a and impinging on fitted cable bushing 12 runs past the opened stripping jaws 8a, 8b. The opened stripping jaws 8a, 8b thus also lie completely outside a wedge shaped region-of-view that extends from the camera 9a towards the cable bushing 12 and encompasses the cable bushing 12 laterally (see FIG. 3) in particular.

In this example, the camera 9a may be directed towards the hollow mandrel 11. Specifically, the camera 9a may be arranged above the fitting region A and above the hollow mandrel 11. Alternatively, the camera 9b may also be arranged underneath the fitting region A and underneath the hollow mandrel 11 (shown with dashed lines in FIG. 1).

Furthermore, the rotation axes of stripping jaws 8a, 8b are aligned parallel to the hollow mandrel 11. In particular, the rotation axes of the stripping jaws 8a, 8b are arranged one above the other on one side of the hollow mandrel 11 and are at an equal distance from the latter (see FIG. 3).

The optical axis of the camera 9a advantageously runs through the hollow mandrel 11, in particular through its axis. It should be understood, as can be seen in FIG. 3, that the rotation axes of the two stripping jaws 8a, 8b may be arranged on one side away from the said observation beam D, in particular away from the optical axis of the camera 9a, and each rotation axis of each stripping jaw 8a, 8b is thus arranged on each side away from a straight line running through the axis of the hollow mandrel 11 and aligned normally to the center observation beam D/optical axis.

Accordingly, in exemplary specific arrangements as depicted in FIG. 3, the rotation axes of stripping jaws (8a, 8b) are also at an equal distance from observation beam D/the optical axis of the camera 9a. Furthermore, they are also at an equal distance from the straight line running through the axis of the hollow mandrel 11 and aligned normally to the optical axis.

The pivot range of stripping jaws 8a, 8b between their closed position and their open position is 90° in this example. However, the selection of another angle is also conceivable, as long as camera 9a is ensured a view of the cable bushing 12.

In FIG. 6 it may also be seen that stripping jaws 8a, 8b enclose and touch the hollow mandrel 11 when in closed position. This ensures good centering of stripping jaws 8a, 8b to the hollow mandrel 11. Additionally or alternatively, stripping jaws 8a, 8b may touch each other in a form-fitting manner when in closed position. For example, corresponding projections and cut-outs may be provided on stripping jaws 8a, 8b.

Relevant to good centering, pivot plate 13 may be at least four times thicker than intermediate plate 14. In this manner, intermediate plate 14 may be adapted to different hollow mandrels 11 with only a little processing outlay and material use. Different intermediate plates 14 may thus be provided with semi-circular cutouts of different sizes for different cable bushings 12 or cable diameters. Such cutouts typically are comparatively simple to produce owing to the small material thickness of the intermediate plates 14.

Stripping jaws 8a, 8b or, as depicted in the figures, at least components of the stripping jaws 8a, 8b (in this case the pivot plates 13) are each designed identically.

Figure 7:
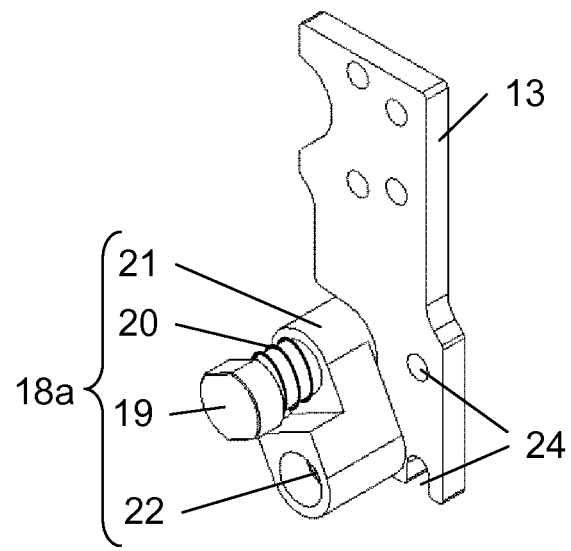
FIG. 7 depicts a quick release fastener for mounting a stripping jaw.
Figure 8:
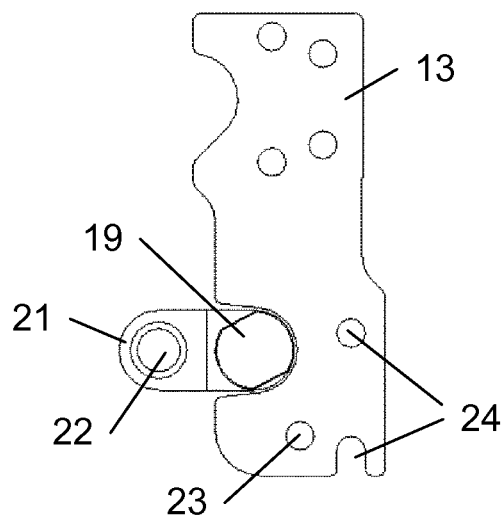
FIG. 8 depicts the quick release fastener of FIG. 7 in an open position.
Figure 9:
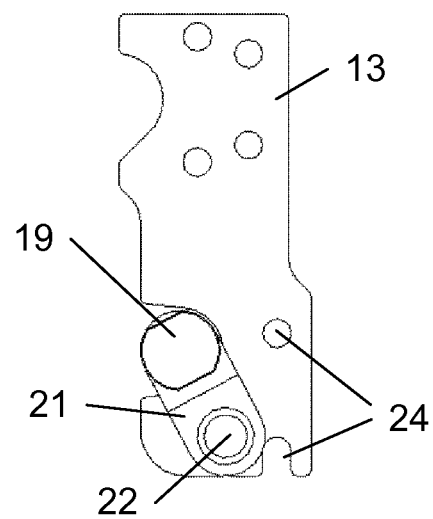
FIG. 9 depicts the same as FIG. 8, but with a closed quick release fastener.

Turning to FIG. 7, it depicts in perspective view pivot plate 13 of a stripping jaw 8a, 8b in combination with a quick release fastener 18a that may be operated without tools. FIGS. 8-9 each depict the arrangement shown in FIG. 7 in plan view, first with an open quick release fastener 18a (FIG. 8) and then with a closed quick release fastener 18a (FIG. 9).

Quick release fastener 18a includes a closing lever 21 that may be rotated about a pin 19. This quick release fastener 18a is mounted with the aid of a spring 20 and is designed to press stripping jaws 8a, 8b against machine 1 with the aid of the spring force, as in this depicted example actually against drives 17a for the stripping jaws 8a, 8b, when in a closed position. In this example, quick release fasteners 18a, 18b are likewise mounted on drives 17a.

Quick release fastener 18a may include, as in this example, a sprung latching element 22. More particularly, a sprung ball pin 22 is designed to latch into a cutout 23 in the stripping jaw 8a, 8b when the quick release fastener 18a is in a closed position. In this manner, the stripping jaw 8a, 8b is held securely and does not slip out of its holder even at high accelerations.

To transmit torque from drives 17a to stripping jaws 8a, 8b, the stripping jaws 8a, 8b may, as shown in FIGS. 7-9, have cutouts 24 at a distance from their rotation axes, in which pins of the drives 17a may engage.

Checking of the fitted cable bushing 12 is facilitated by an exemplary presented machine 1 for fitting a cable bushing 12 on a wire/cable, in particular without significantly increasing the base area C or the width of the exemplary machine 1. Specifically, this is achieved by arranging camera 9a above/underneath the fitting region and pivoting stripping jaws 8a, 8b during actuation. This results in a reduced space requirement compared to linearly displaceable stripping jaws.

The presented versions of machine 1 are merely intended to illustrate certain principles according to the present disclosure. Even if it is a preferred version, different designs may of course be equivalently used. In particular, the camera 9a, 9b may also be arranged laterally offset with respect to the fitting region or even with a horizontally aligned optical axis. Furthermore, individual parts of the present disclosure may also be used independently. This applies in particular to the quick release fastener 18a, 18b, the division of the stripping jaws 8a, 8b into pivot plate 13 and intermediate plate 14, and the centering of the stripping jaws 8a, 8b on the fitting region 11.

Further versions of machines and processes or methods according to the present disclosure, and combinations thereof, for which a specialist person skilled in the art with knowledge of the present disclosure would not require any further technical teaching however, may be understood as within the context of and within the scope of the appended claims. The versions explicitly set forth only represent a proportion of the many possibilities for the invention and should not be used to limit the field of application of the invention. For the person skilled in the art, it should be straightforward to adapt the disclosure to specific requirements, based on particular considerations, without departing from the protected scope of the claims. It should also be understood in the context of the preceding discussion that the present invention is not limited in any manner to merely the described and drawings-depicted exemplary implementations, but may be realized in many forms and dimensions without abandoning the region and scope of claimed protection. Thus, in closing, it should be noted that the invention is not limited to the abovementioned versions and exemplary working examples. Further developments, modifications and combinations are also within the scope of the appended patent claims and are placed in the possession of the person skilled in the art from the entirety of the present disclosure. Accordingly, the structures and techniques described and illustrated herein should be understood to be illustrative and exemplary, and not necessarily limiting upon the scope. The scope of the present invention is defined by the appended claims, including known equivalents and unforeseeable equivalents at the time of filing of this application.

LIST OF REFERENCE SYMBOLS

1 Machine for fitting cable bushings
2 Base plate
3 Frame
4 Motor
5 Chain conveyor
6 Storage container
7 Vibrating rail
8a, 8b Stripping jaws
9a, 9b Camera
10 Base support
11 Hollow mandrel
12 Cable bushing
13 Pivot plate
14 Intermediate plate
15 Bushing cage
16 Feed funnel
17 Drive for mandrel
17a Swivelling drives for stripping jaws
18a, 18b Quick release fastener
19 Pin
20 Spring
21 Closing lever
22 Latching element/ball pin
23 Cut-out for latching element/ball pin
24 Cut-outs for drive pins
A Fitting region
B Feed direction for the wire/cable
C Base area
D Observation beam

What is claimed is:

1. A cable bushing fitting machine comprising:
a fitting region;
a mandrel disposed at said fitting region, said mandrel being hollow to receive a cable therethrough;
a first rotatably mounted stripping jaw arranged in said fitting region;
a second rotatably mounted stripping jaw arranged in said fitting region;
a drive configured to mount cable bushings onto cable by successively disposing respective ones of the cable bushings onto the mandrel, feeding the cable through mandrel, and executing a relative movement between said mandrel and said first and second rotatably mounted stripping jaws to locate the respective cable bushings onto the cable;
a camera directed towards said fitting region and having optical axis intersecting said mandrel to capture images of the respective cable bushings located on the cable;
said first rotatably mounted stripping jaw having a respective rotation axis aligned parallel to an axis of said mandrel, said first stripping jaw rotation axis being laterally offset from the optical axis of said camera by a distance sufficient to permit said camera unimpeded views of cable bushings in said fitting region when said first stripping jaw is at least to a first selected extent opened;
said second rotatably mounted stripping jaw having a respective rotation axis aligned parallel to the axis of said mandrel, said second stripping jaw rotation axis being laterally offset from the optical axis of said camera by a distance sufficient to permit said camera unimpeded views of cable bushings in said fitting region when said second stripping jaw is at least to a second selected extent opened; and
said first stripping jaw rotation axis and said second stripping jaw rotation axis being equidistant from said camera optical axis and being situated on one side of said mandrel relative to said camera optical axis, such that: (i) rotation of the first and second stripping jaws towards one another, and towards the mandrel, results in the respective cable bushings being captured by the first and second stripping jaws, and (ii) advancement of the cable through the mandrel while the respective cable bushings are captured results in the respective cable bushings being located on the cable.

2. The cable bushing fitting machine as claimed in claim 1, further comprising: at least one of said stripping jaws has an intermediate plate, and said at least one of said stripping jaws having said intermediate plate has a pivot plate that is at least four times thicker than said intermediate plate.

3. The cable bushing fitting machine as claimed in claim 1, further comprising: a quick release fastener configured to mount said first stripping jaw on said cable bushing fitting machine.

4. The cable bushing fitting machine as claimed in claim 3, further comprising: a spring-mounted closing lever configured to press said first stripping jaw against said cable bushing fitting machine.

5. The cable bushing fitting machine as claimed in claim 3, further comprising: a cutout in said first stripping jaw; and, a sprung latch configured to latch into said cutout when said quick release fastener is closed.

6. The cable bushing fitting machine as claimed in claim 1, further comprising: a stripping jaw drive; and a cutout in said first stripping jaw, said cutout being at a distance from said first stripping jaw rotation axis to engage a pin of said stripping jaw drive.

* * * * *